United States Patent
Fuhrmann et al.

(10) Patent No.: US 12,541,981 B2
(45) Date of Patent: Feb. 3, 2026

(54) METHOD FOR RECOGNIZING A ROAD INTERSECTION

(71) Applicant: Robert Bosch GmbH, Stuttgart (DE)

(72) Inventors: Stephan Fuhrmann, Stuttgart (DE); Paul Wolff, Ludwigsburg (DE); Jan Oberlaender, Ilsfeld (DE); Oezguer Sen, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 320 days.

(21) Appl. No.: 18/326,809

(22) Filed: May 31, 2023

(65) Prior Publication Data
US 2024/0037963 A1    Feb. 1, 2024

(30) Foreign Application Priority Data
Jul. 29, 2022   (DE) .................... 10 2022 207 851.9

(51) Int. Cl.
*G06V 20/56*   (2022.01)
*B60W 30/12*   (2020.01)

(52) U.S. Cl.
CPC ........... *G06V 20/588* (2022.01); *B60W 30/12* (2013.01)

(58) Field of Classification Search
None
See application file for complete search history.

(56) References Cited

U.S. PATENT DOCUMENTS

2018/0164812 A1* 6/2018 Oh ................... G06V 10/82
2021/0323553 A1* 10/2021 Tanaka ............. B60W 30/18154

FOREIGN PATENT DOCUMENTS

DE        102011076763 A1    12/2012

* cited by examiner

*Primary Examiner* — Thomas D Lee
(74) *Attorney, Agent, or Firm* — NORTON ROSE FULBRIGHT US LLP

(57) ABSTRACT

A method for recognizing a road intersection ahead in the driving direction of a vehicle. In the method, an overall probability of the presence of the road intersection ahead is calculated on the basis of data acquired during the trip of the vehicle and the presence of the road intersection ahead is deduced on the basis of the calculated overall probability.

14 Claims, 4 Drawing Sheets

METHOD FOR RECOGNIZING A ROAD INTERSECTION

CROSS REFERENCE

The present application claims the benefit under 35 U.S.C. § 119 of German Patent Application No. DE 10 2022 207 851.9 filed on Jul. 29, 2022, which is expressly incorporated herein by reference in its entirety.

FIELD

The present invention relates to a method for recognizing a road intersection ahead and to an arrangement for performing the present invention.

BACKGROUND INFORMATION

A road intersection refers to a location where two or more roads intersect. Knowledge of where road intersections are located is in particular of great importance when using driver assistance systems.

German Patent Application No. DE 10 2011 076 763 A1 describes a method for operating a driver assistance system of a vehicle, comprising the following steps: sensing a vehicle environment, sensing a vehicle position relative to the vehicle environment, and associating the sensed vehicle environment and the vehicle position with an ontological data structure in which traffic rules are implemented, in order to form an associated data structure, and evaluating the associated data structure.

An example of such a driver assistance system is lane center guidance. A function of a driver assistance system that is provided to keep a vehicle centered in its own lane and prevent a critical deviation from its own roadway is referred to as lane center guidance.

Lane center guidance assistants rely on existing and correctly recognized lane lines to keep the vehicle within the lane. It should be noted in this respect that certain courses of the road, such as intersections, especially in urban areas, cause some difficulty since they sometimes have no lane markings or too many markings. Traditional algorithms for computer image processing (CV: computer vision) do not in all cases guarantee unambiguous ego lane line recognition.

An alternative approach is to use artificial neural networks (KNN) for lane line recognition or to use map-based approaches. In this context, however, it must be taken into account that KNNs are not yet comprehensively used and maps present difficulties in up-to-dateness and availability in the vehicles.

Furthermore, it should be taken into account that non-recognition or misrecognition of lane lines may result in a reduction of the availability of the assistance system to the driver or in undesired steering behavior. Modern lane center guidance assistants provide good availability on highways and country roads, but availability decreases in urban scenarios for the reasons mentioned, e.g., due to the increased occurrence of intersections.

SUMMARY

According to the present invention, a method for recognizing a road intersection and an arrangement are provided. Embodiments of the present invention arise from the disclosure herein.

The method according to an example embodiment of the present invention serves for recognizing a road intersection ahead in the driving direction of a vehicle, in which method an overall probability p(TrafficIntersection) of the presence of the road intersection ahead is calculated on the basis of data acquired during the trip of the vehicle and the presence of the road intersection ahead is deduced on the basis of the calculated overall probability.

Data, typically about the surroundings, in particular information about the road on which the vehicle is traveling, are thus acquired during the trip of the vehicle, and these data, e.g., image data, are evaluated in order to calculate an overall probability of the presence of a road intersection ahead. This overall probability thus provides information as to how likely it is that a road intersection is ahead. A classification of this road intersection may also be included.

The overall probability is then interpreted and it is determined whether or not a road intersection is ahead. This interpretation may comprise, for example, a comparison with a threshold value. If the value for the overall probability is above the threshold value, the presence of a road intersection is assumed.

For example, image data of at least one camera associated with the vehicle can be used as data.

The image data can be processed or pre-processed by means of computer image processing, i.e., by means of a so-called CV algorithm (CV: computer vision), in order to ascertain in this way the overall probability or values used to calculate the overall probability.

In one embodiment of the present invention, the method is used as part of a lane center guidance assistant.

In the method of the present invention, a lane width adjustment may additionally be carried out.

Furthermore, according to an example embodiment of the present invention, lane lines to be used may be checked. They are discarded where appropriate.

In addition, a lane line shortening may alternatively or additionally be carried out in order to avoid a driving corridor that is curved too strongly.

Alternatively or additionally, it may be decided whether a preceding vehicle is followed.

The method according to the present invention may achieve, at least in some of the embodiments, an improvement in the performance of lane center guidance assistants in intersection scenarios in terms of availability and robustness. This is also referred to as traffic intersection mode. This mode comprises a classification of intersection scenarios using traditional features, such as traffic lights and stop lines and a decision logic for creating the driving corridor in intersections, based on the information recognized in the intersection and available, such as line segments and preceding vehicles.

Both the classification and decision logic are typically constructed dynamically and include several features in order to be able to recognize different types of intersections regardless of the target country. The simultaneously possible modular design allows the extension of the currently developed approach in order to implement in the future both the linking of map information and the extension of the handling of turning operations.

Four features, namely traffic lights, stop lines, lane width and road edge, are used in the design for the classification of intersections. In order to recognize as many intersection types as possible dynamically and generically, a probability value is calculated for each feature. All individual probabilities result in an overall probability, which makes it possible to deduce an intersection in the respective situation. These features are discussed in more detail below:

Traffic Lights

For recognized traffic lights, a probability value p(TrafficLight) is ascertained as a function of recognition and weighting. A probability value p(TrafficLightPosition) is furthermore calculated as a function of the size and the position, namely the distance in the longitudinal and/or lateral direction, of the lights.

p(TrafficLight) indicates the probability of whether a traffic light is recognized or present. p(TrafficLightPosition) indicates how likely it is that the traffic light is associated with the ego vehicle or its lane. The conditional probability of p(TrafficLight) and p(TrafficLightPosition) that enters into the calculation of the overall probability p(TrafficIntersection) then indicates whether a traffic light relevant to the driver's roadway is ahead. This prevents that traffic lights belonging to a neighboring intersection or the like result in a positive decision for an intersection in the ego lane.

Stop Line

The probability value p(StopLine) is set as a function of a recognized stop line and a weighting.

Lane Width

The probability value p(LaneWidth) for the lane width is based on the change of the lane width over an adjustable distance. For this purpose, a slope over the distance may be calculated by means of a linear regression over the lane width values. The slope can subsequently be mapped to a probability value via linear interpolation.

Road Edge

Similarly to the lane width, the probability value p(RoadEdge) for the road edge can be calculated via a linear regression and a linear interpolation. For the linear regression, the length values of the road edge over the distance can be used. The expectation is that the road edge will become shorter at an intersection.

The probability value p(RoadEdge) indicates how likely it is that a road edge becomes shorter. The underlying assumption is that at an intersection, the road edge, i.e., the curb or the like, does not continue since the intersecting road interrupts this edge. If there is no intersection, the assumption is that the road edge is not interrupted and the length of the road edge does not become continuously shorter.

The overall probability value p(TrafficIntersection) can be calculated using the formula:

$$p(TrafficIntersection) = p(RoadEdge) \star (p(StopLine) + p(LaneWidth)) + p(StopLine) + p(TrafficLight) \star (p(StopLine) + p(TrafficLightPosition)) + p(LaneWidth) \star (p(TrafficLight) \star (p(StopLine) + p(TrafficLightPosition)))$$

The described arrangement is configured to perform the method presented. This arrangement can be implemented in software and/or hardware. Furthermore, the arrangement can, for example, be implemented as a computer program in a control unit of a vehicle or can be designed as such a control unit.

Further advantages and embodiments of the present invention arise from the description herein and the figures.

It goes without saying that the aforementioned features and the features yet to be explained below can be used not only in the respectively specified combination but also in other combinations or on their own, without leaving the scope of the present invention.

DETAILED DESCRIPTION OF EXAMPLE EMBODIMENTS

The present invention is illustrated schematically in the figures on the basis of embodiments and is described in detail below with reference to the figures.

FIGS. 1 to 4 in particular describe a method for interpreting the vehicle environment when a road intersection ahead has been recognized, for stabilizing and forming the driving corridor in intersection areas.

Figure 1:
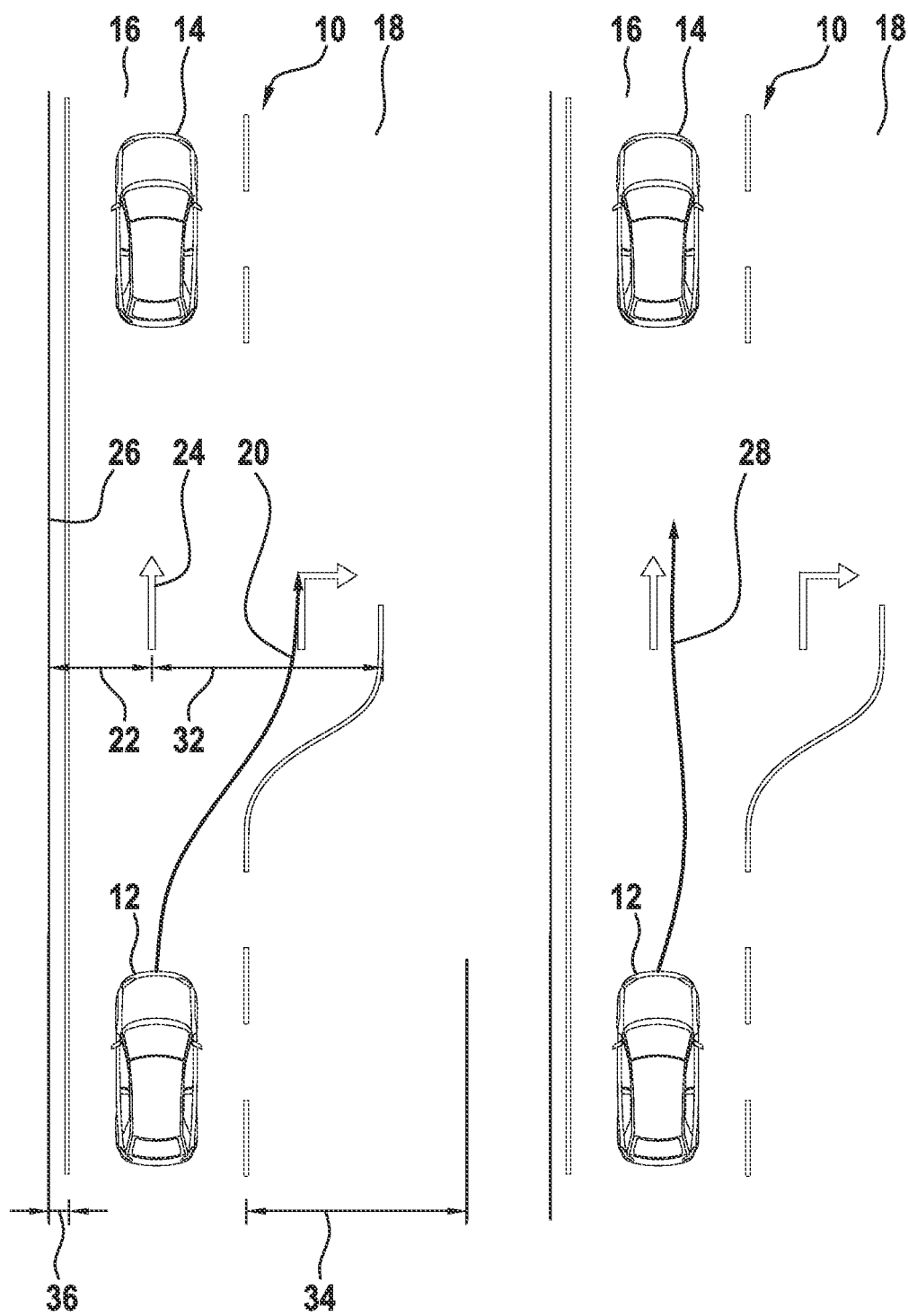
FIG. 1 shows a plan view of two roadways to illustrate a lane width adjustment, according to an example embodiment of the present invention.

FIG. 1 shows, on the left side and on the right side, a respective roadway 10 on which a vehicle 12 and a preceding vehicle 14 are located in a lane 16. FIG. 1 illustrates a frequently occurring case in which the lane 16 is widened by an additional turning lane 18, which can lead to undesirable behavior by driving over two lanes 16 and 18 as illustrated by arrow 20.

In the case of a widening, the driving corridor width is adjusted again based on the tracked lane width. The widening and non-widening sides are determined via the distance (arrows 36 and 34) of the ego lane lines to the road edge 26. In addition, the position of the preceding vehicle 14, if present, is used as aid in determining the widening and non-widening sides.

For this purpose, arrows 22 and 32, which illustrate the distance of the lane lines to the lane center, are used for the preceding vehicle 14. This results in a travel path for the vehicle corresponding to arrow 28.

Two criteria are explicitly considered since one may not be applicable.

Figure 2:
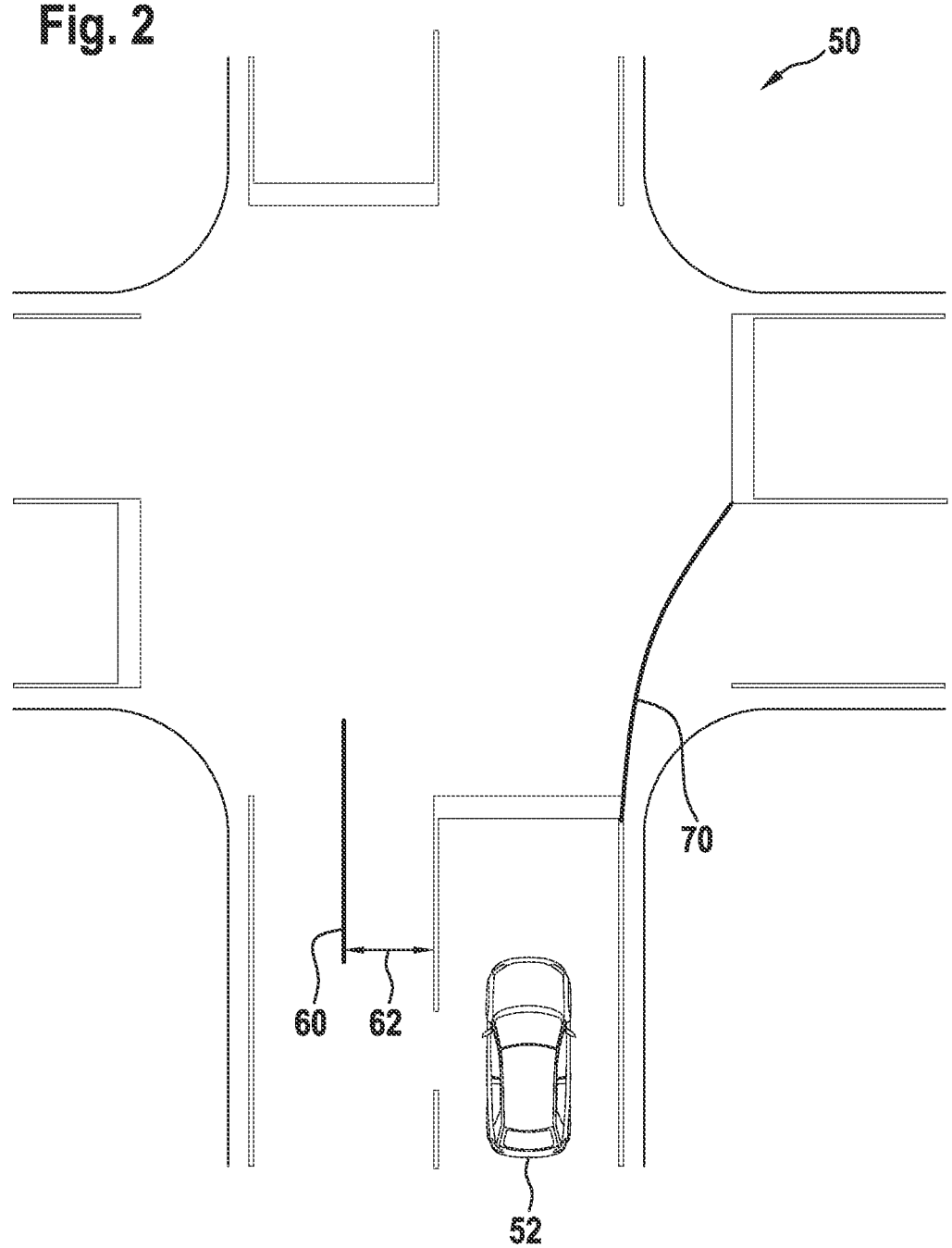
FIG. 2 shows a plan view of an intersection to illustrate lane line use, according to an example embodiment of the present invention.

FIG. 2 shows a road intersection that is ahead in the driving direction of a vehicle 52.

As mentioned at the outset, intersection scenarios often have both ego lane lines and further markings, which can result in interferences and thus incorrect classification.

In intersection scenarios, the recognized lane lines are tested for their geometry more strongly than in other situations, particularly with regard to the curvature and angle of the line to the vehicle. In the case that the limit values are exceeded, the lines are no longer used for the driving corridor formation.

The driving corridor is the area where the vehicle can drive and which reflects the ego lane. Generally, the driving corridor is created via the left and right recognized lane line. However, for the reasons above, this may result in undesired behavior at intersections if the recognized lane line does not represent the actual ego lane. Some deviation is generally not serious and in most cases does not result in undesirable behavior but does so at intersections since the deviation is usually greater here, due to the significantly higher number of markings, which can result in interferences in the lane line recognition. The geometry is tested more strongly and, in case of small deviations, the lane markings are no longer used, in order to keep the driving corridor stable. In such cases, if possible, attempts are made to maintain the corridor via a line and tracked lane width, or alternatively, if possible, a switch to lock on target is made, as described in FIG. 4.

In this example, a line 60 is discarded based on the difference (double arrow 62) in the lateral distance to the current driving corridor and is used again. Furthermore, a further line 70 is discarded based on the high curvature and the heading angle and is used again.

The intention is to not use lines that briefly turn away as a result of interferences (arrow 60), e.g., due to misrecognition of the CV. When they are recognized again or come back to the previous position, the lines are again used for driving corridor formation. The basic idea is that the fewer lines are used, the more unstable and riskier driving with a lane center guidance assistant becomes. In order to avoid shutdown of the assistance system, which results in reduced availability, both the non-use of lines in intersection areas and the reuse of lines are continuously tested.

FIG. 3 again shows, on the left side and on the right side, a roadway 100 on which a vehicle 102 is located in a lane 104. Furthermore, a crosswalk 106 can be seen.

Figure 3:
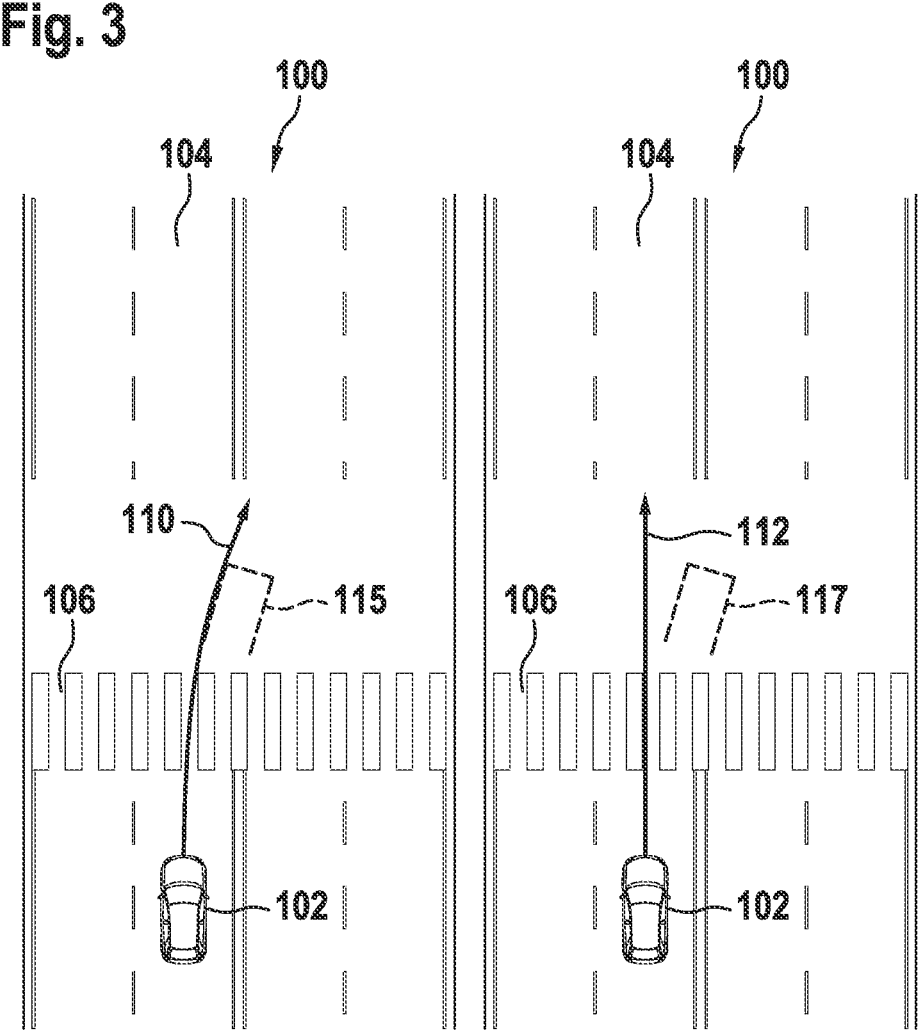
FIG. 3 shows a plan view of two roadways to illustrate a lane width shortening, according to an example embodiment of the present invention.

FIG. 3 illustrates that in some cases, the deviations in curvature and angle are not strong enough to be discarded, as described in FIG. 2, but the markings 115, 117 should still not enter into the recognized lane line. These interferences can, for example, be caused by turning lane markings 115, 117, as shown in FIG. 3. This may result in curve behavior at intersections (arrow 110), which in turn may result in an unwanted drift into oncoming traffic or in a turning operation.

In order to avoid a curved driving corridor, the driving corridor is therefore shortened at a recognized stop line or the recognized crosswalk 106, namely under the assumption that markings behind the crosswalk or behind a stop line do not belong to the perceived ego lane line (arrow 112).

Figure 4:
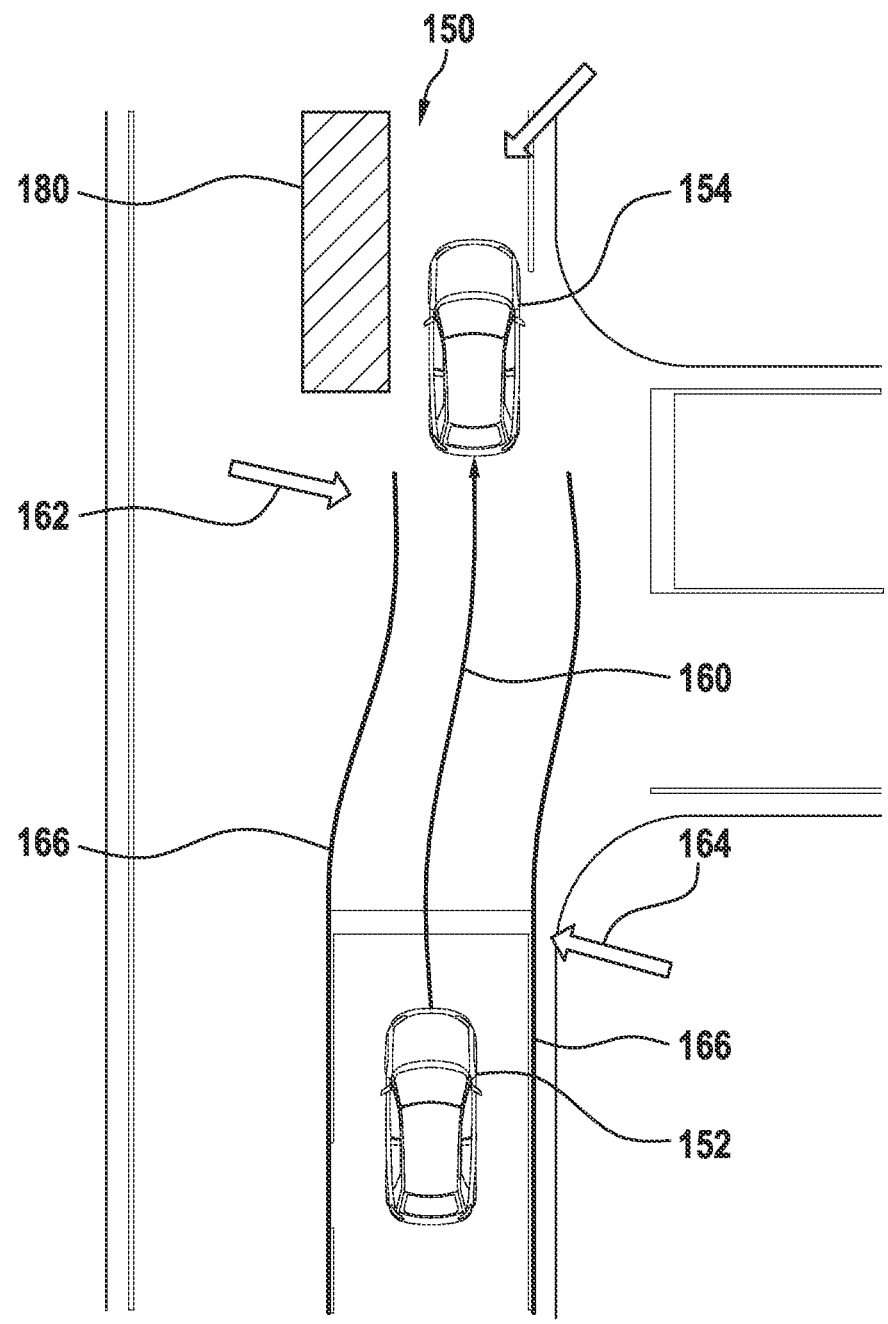
FIG. 4 shows a plan view of a roadway to illustrate a lock on target, according to an example embodiment of the present invention.

FIG. 4 likewise shows a roadway 150 with a vehicle 152 and a preceding vehicle 154.

In order to keep the availability of the lane center guidance high even in situations of missing markings or markings that are not to be used, the driving corridor is formed in these cases based on the preceding vehicle 154; this is referred to as lock on target.

Arrow 164 illustrates that the lane markings 166 for the ego lane generally end at a stop line at intersections. In order to still keep the availability of the lane center guidance assistance high but at the same time avoid steering toward any obstacles 180, such as traffic islands, the driving corridor is planned based on the preceding vehicle 154 (arrow 160).

In order to prevent undesired following (arrow 160), e.g., in the case of a turning operation of the preceding vehicle, the lateral speed and the offset of the preceding vehicle 154 are ascertained, and if the lateral speed is too high or the offset is too high, following is ended. Arrow 162 illustrates artificial line generation in order to adjust the driving corridor to the preceding vehicle 154.

The method presented can be used, for example, in conjunction with lane center guidance assistants, which are in particular video-based. It is important that map-based data do not have to be used, but that only data that are acquired during the trip of the vehicle, typically by sensors, e.g., cameras, of the vehicle can be or are used. These data are then evaluated in order to recognize road intersections ahead.

What is claimed is:

1. A vehicle control method comprising:
    recognizing a road intersection ahead in a driving direction of a vehicle by performing the following steps:
        calculating, by a processing system of the vehicle that includes at least one processor, an overall probability of presence of the road intersection ahead based on data acquired by a sensor system of the vehicle during a trip of the vehicle;
        comparing, by the processing system, the calculated overall probability to a predefined threshold; and
        based on a result of the comparison, determining by the processing system that the road intersection is present; and
    modifying, by the processing system and based on the determination, an automatic control of the vehicle performed by the processing system during the trip of the vehicle for automatic lane keeping.

2. The vehicle control method according to claim 1, wherein image data of at least one camera are used as the data.

3. The vehicle control method according to claim 2, wherein the image data are processed using computer image processing.

4. The vehicle control method according to claim 1, wherein:
    the modifying of the automatic control includes carrying out a lane width adjustment to obtain a determined modified width of a lane; and
    the automatic lane keeping includes controlling the vehicle to be centered in the lane according to the modified width of the lane.

5. The vehicle control method according to claim 1, wherein lane lines to be used are checked.

6. The vehicle control method according to claim 1, wherein the modifying of the automatic control includes carrying out a lane line reduction.

7. The vehicle control method according to claim 1, wherein the modifying of the automatic control includes determining to follow a preceding vehicle.

8. The method according to claim 1, further comprising determining, for each of a plurality of road characteristics, a respective probability of presence of the respective road characteristic based on the data acquired during the trip of the vehicle, wherein the calculating of the overall probability is based on the plurality of the respective probabilities determined for the plurality of road characteristics.

9. The vehicle control method according to claim 1, wherein the modifying of the automatic control for the automatic lane keeping includes controlling a drive of the vehicle to keep the vehicle out of a widened lane section in response to the determination that the road intersection is present.

10. The vehicle control method according to claim 1, wherein the modifying of the automatic control for the automatic lane keeping includes disregarding a subset of a plurality of lane markings in response to the determination that the road intersection is present, with the automatic control of the vehicle being performed to keep the vehicle in a lane that is identified using remaining ones of the plurality of lane markings that have not been disregarded.

11. The vehicle control method according to claim 1, wherein the modifying of the automatic control for the automatic lane keeping includes switching from a lane keeping control based on lane markings to a lane keeping control based on a drive of a lead vehicle.

12. A vehicle control method comprising:
recognizing a road intersection ahead in a driving direction of a vehicle by performing the following steps:
calculating, by a processing system of the vehicle that includes at least one processor, an overall probability p(TrafficIntersection) of presence of the road intersection ahead based on data acquired by a sensor system of the vehicle during a trip of the vehicle, wherein the following probabilities are taken into account in the calculation of the overall probability p(TrafficIntersection):
probability p(TrafficLight) of a traffic light;
probability p(TrafficLightPosition) of a traffic light position;
probability p(StopLine) of a stop line;
probability p(LaneWidth) of a lane width; and
probability p(RoadEdge) of a road edge; and
deducing, by the processing system, the presence of the road intersection based on the calculated overall probability; and
modifying, by the processing system and based on the determination, an automatic control of the vehicle performed by the processing system during the trip of the vehicle for automatic lane keeping.

13. The method according to claim 12, wherein the overall probability p(TrafficIntersection) of the presence of the road intersection ahead is calculated from:

$$p(TrafficIntersection) = p(RoadEdge) \star (p(StopLine) + p(LaneWidth)) + p(StopLine) + p(TrafficLight) \star (p(StopLine) + p(TrafficLightPosition)) + p(LaneWidth) \star (p(TrafficLight) \star (p(StopLine) + p(TrafficLightPosition))).$$

14. A vehicle control system of a vehicle comprising:
a sensor system; and
a processor system that includes at least one processor, wherein the processor system is configured to:
recognize a road intersection ahead in a driving direction of the vehicle by:
calculating an overall probability of presence of the road intersection ahead based on data acquired by the sensor system during a trip of the vehicle;
comparing the calculated overall probability to a predefined threshold; and
based on a result of the comparison, determining by the processing system that of the road intersection is present; and
modify, based on the determination, an automatic control of the vehicle performed by the processing system during the trip of the vehicle for automatic lane keeping.

* * * * *